United States Patent [19]

Pollock et al.

[11] Patent Number: 4,967,086
[45] Date of Patent: Oct. 30, 1990

[54] IDENTIFICATION OF SCINTILLATION CRYSTALS

[75] Inventors: Robert W. Pollock, Evanston; Daniel J. Godlewski, Des Plaines, both of Ill.

[73] Assignee: Siemens Gammasonics, Inc., Hoffman Estates, Ill.

[21] Appl. No.: 905,892

[22] Filed: Sep. 10, 1989

[51] Int. Cl.$^5$ .............................................. G01T 1/202
[52] U.S. Cl. .................................. 250/483.1; 250/337
[58] Field of Search ................... 250/337, 483.1, 485.1, 250/472.1

[56] References Cited

U.S. PATENT DOCUMENTS

| | | | |
|---|---|---|---|
| 3,725,659 | 4/1973 | Culley | 250/337 |
| 3,761,710 | 9/1973 | Yamashita et al. | 250/337 |
| 3,786,254 | 1/1974 | Yamashita et al. | 250/337 |
| 4,220,852 | 9/1980 | Seidel | 250/337 |

Primary Examiner—Janice A. Howell
Assistant Examiner—Drew A. Dunn
Attorney, Agent, or Firm—Mark H. Jay

[57] ABSTRACT

A small scintillation crystal has a surface which is coated with a thin layer of aluminium or cobalt. The aluminium is etched with identification markings, as by a laser.

6 Claims, 1 Drawing Sheet

FIG. 1 FIG. 2
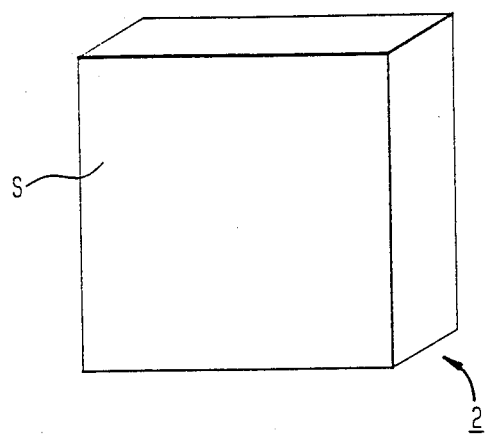
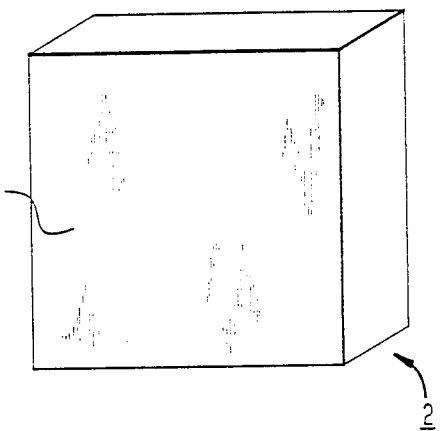
FIG. 3
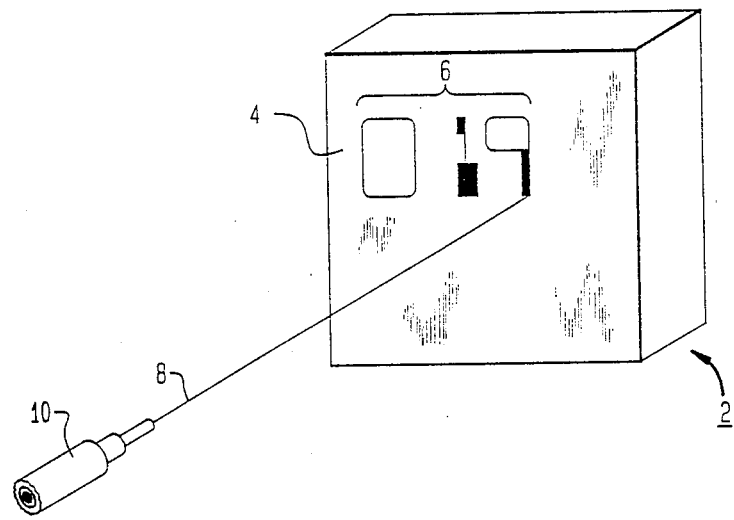

IDENTIFICATION OF SCINTILLATION CRYSTALS

BACKGROUND OF THE INVENTION

The invention relates to scintillation crystals. More particularly, the invention relates to scintillation crystals of the type which are used in radiation dose monitoring programs. In its most immediate sense, the invention relates to thermoluminescent dosimeter (TLD) crystals.

In work places where employees are subjected to ionizing radiation, the total dose of radiation to which the employee is subjected must be monitored. This permits the empolyer to ensure (by appropriate reassignments) that no employee receives more than a predetermined maximum dose of radiation in a particular period.

To do this, it is known to use a radiation badge which is given to, and worn by, the employee. The badge contains a TLD crystal. During use, ionizing radiation strikes the crystal and creates trapped electrons. When the crystal is then heated up, scintillation events are created in proportion to the amount of radiation to which the crystal has been exposed, and the scintillation events are counted to register this radiation exposure. After the crystal has been read out, it is annealed to remove all the trapped electrons, and is then reused.

In a conventional radiation monitoring program, an employer issues each of its employees a radiation badge at, for example, the beginning of the week. The employee wears the badge for the week and takes it off, and all the badges are then sent to a service organization. This organization processes the badges, reads out and organizes the radiation dose information for the various employees, and restocks the badges with annealed crystals for reuse during the next week.

The handling of the scintillation crystals presents difficulties for the service organization. Because the crystals are small and bear no identifying marks, they must be, e.g., manually placed in a magazine of some sort in a known order. This is because the crystals vary in their response to ionizing radiation and the scintillation data generated during readout can be properly interpreted only if the response of the crystal is taken into account. Furthermore, even after the crystal has been read out and annealed, the crystal must continue to be identifiable because it is reused.

Various attempts have been made to affix identifying marks to the scintillation crystals. These include printing, labelling, etc., but for one reason or another, all have proved unfeasible.

It would be advantageous to eliminate mechanical difficulties associated with handling of scintillation crystals, particulary crystals such as are used in radiation badges.

One object of the invention is to provide a technique by which a scintillation crystal, particularly of the type used in radiation badges, can be physically identified.

Another object is to generally facilitate the processing of radiation badges.

Still another object is to generally improve on known devices and methods used in processing of radiation badges.

SUMMARY OF THE INVENTION

In accordance with the invention, identification markings are placed upon each individual scintillation crystal. This is accomplished by coating a surface of the crystal with a thin layer of a metal which transmits ionizing radiation and then etching the layer with identification markings. Advantageously, the metal is aluminium or cobalt and etching is carried out using a laser.

Because it is feasible to accurately etch even minute articles using a laser, there is no technical impediment to affixation of the identification markings on the crystal. Furthermore, because the metal layer is essentially transparent to gamma radiation, the sensitivity of the crystal is unaffected. Because the identification markings are physically placed upon the crystal, handling costs are greatly decreased.

The invention is further advantageous in that it permits improved accuracy in radiation measurement. This comes about because scintillation crystals are conventionally calibrated in batches. The response of each individual scintillation crystal is therefore determinable only on a lot-by-lot basis rather than on a crystal-by-crystal basis. Because sample-to-sample variation is substantial, this method of measurement is not entirely satisfactory. It would alternatively be possible to subject each of the scintillation crystals to individual calibration, but this is not feasible using conventional techniques because the crystals are small and can easily be mixed up.

However, where each crystal is physically identified in accordance with the invention, it is entirely feasible to calibrate a plurality of crystals simultaneously by exposing all of them to the same amount of radiation, and reading them out individually. This makes it possible to have a highly accurate knowledge of the response of each scintillation crystal to more accurately assess the radiation dose to which it has been exposed.

While the invention will be further described in connection with radiation badges such as are worn by human beings, it will be appreciated that this is not necessary. Crystals of this type are also, e.g. taped to a patient to monitor the amount of radiation to which the patient has been exposed or placed in a pouch to monitor the amount of radiation in a particular area. Further, while the invention is most useful with small scintillation crystals, it is equally usable with large ones.

BRIEF DESCRIPTION OF THE DRAWINGS

Exemplary and non-limiting preferred embodiments of the invention are shown in the drawings, in which:

FIG. 1 shows a scintillation crystal of the type which which the invention is concerned;

FIG. 2 shows the scintillation crystal of FIG. 1 with a metal coating in accordance with the invention; and FIG. 3 is a schematic illustration of the etching of the metal coating in accordance with a preferred embodiment of the invention.

DETAILED DESCRIPTION OF A PREFERRED EMBODIMENT

A crystal 2 of LiF scintillation material of the type used in radiation badges is approximately 0.125 inch wide, 0.125 inch high and 0.040 inch thick. The crystal 2 is produced by conventional techniques which are known to persons skilled in the art and will not be described further, and the dimensions of the crystal 2 are not part of the invention. Furthermore, the crystal 2 need not be LiF; it may alternatively be $CaSO_4$, $CaF_2$ or $Li_2B_4O_7$.

In accordance with a preferred embodiment of the invention, one surface (here idicated with reference character S) of the crystal 2 is coated with a thin (1200 Angstroms thick) layer 4 of a metal which is advantageously essentiallly transparent to ionizing radiation. In this example, the metal is aluminium, and the layer 4 is applied by vapor-deposition. However, other metals (such as cobalt) may be used and they may be applied by using other techniques.

In the preferred embodiment, the surface S is entirely coated and is one of the wide faces of the crystal 2. This is because it is convenient to coat the whole surface S and to etch an identification marking (described below) on it. However, it is not necessary that the layer 4 be thus dimensioned. It is alternatively possible to coat only part of the surface S with the layer 4. It is only necessary that the layer 4 be located on the exterior of the crystal 2, that the layer 4 be large engough to hold the identification marking used, and that one of the wide faces of the crystal 2 be left uncoated so that scintillation light can, during readout of the crystal, leave the crystal 2 through the uncoated wide face. The location, shape and size of the layer 4 is otherwise a matter of choice.

In the preferred embodiment, an identification marking 6 is etched in the layer 4 using a beam 8 produced by a laser 10. While in this example the marking 6 is in the form of machine-readable alphabetic and/or numeric character(s) to facilitate automated processing, this is not a part of the invention and the identification marking may be, for example, a bar code or some other human- or machine-readable indication.

It is necessary to move the beam 8 with respect to the crystal 2 and to turn the laser 10 on and off in a fashion appropriate to the identification marking to be applied. Techniques for so controlling the etching system are not a part of this invention.

Those skilled in the art will understand that changes can be made in the preferred embodiments here described, and that these embodiments can be used for other purposes. Such changes and uses are within the scope of the invention, which is limited only by the claims which follow.

What is claimed is:

1. A method of placing identification markings upon small scintillation crystals, comprising the following steps:
    coating a surface of the crystal with a thin layer of a metal which transmits ionizing radiation; and
    etching said layer with identification markings.

2. The method of claim 1, wherein said coating step is carried out using aluminium or cobalt metals.

3. The method of claim 1, wherein said coating step is carried out by vapor-deposition.

4. The method of claim 1, wherein said etching step is carried out using a laser.

5. A scintillation crystal for use in radiation badges and the like, comprising a small LiF or $CaSO_4$ or $CaF_2$ or $Li_2B_4O_7$ crystal having a surface which is coated with a thin layer of metal which transmits ionizing radiation and which is etched with identification markings.

6. The crystal of claim 5, wherein the metal is aluminium or cobalt.

* * * * *